United States Patent
Kato et al.

(10) Patent No.: US 10,530,232 B2
(45) Date of Patent: Jan. 7, 2020

(54) MOTOR

(71) Applicant: TDK CORPORATION, Tokyo (JP)

(72) Inventors: Eiji Kato, Tokyo (JP); Makoto Iwasaki, Tokyo (JP)

(73) Assignee: TDK CORPORATION, Tokyo (JP)

(*) Notice: Subject to any disclaimer, the term of this patent is extended or adjusted under 35 U.S.C. 154(b) by 297 days.

(21) Appl. No.: 15/607,993

(22) Filed: May 30, 2017

(65) Prior Publication Data

US 2018/0262142 A1   Sep. 13, 2018

(30) Foreign Application Priority Data

Mar. 13, 2017   (JP) ................. 2017-047903

(51) Int. Cl.
| | |
|---|---|
| H02K 41/03 | (2006.01) |
| H02K 1/02 | (2006.01) |
| H02K 1/27 | (2006.01) |
| H02K 1/16 | (2006.01) |

(52) U.S. Cl.
CPC ............ H02K 41/031 (2013.01); H02K 1/02 (2013.01); H02K 1/2766 (2013.01); H02K 1/16 (2013.01); H02K 2213/03 (2013.01)

(58) Field of Classification Search
CPC ........ H02P 21/22; H02P 29/662; H02P 27/04; H02K 1/2766; H02K 1/27; H02K 41/031; H02K 1/02; H02K 1/16; H02K 2213/03
See application file for complete search history.

(56) References Cited

U.S. PATENT DOCUMENTS

| | | | | |
|---|---|---|---|---|
| 2002/0140309 A1* | 10/2002 | Yanashima | ............ | F04B 35/04 310/162 |
| 2010/0289366 A1* | 11/2010 | Komuro | ................ | C22C 1/0441 310/156.01 |
| 2013/0257190 A1* | 10/2013 | Hamer | ..................... | H02K 9/22 310/52 |
| 2014/0354204 A1* | 12/2014 | Tachibana | ................. | H02P 6/08 318/473 |

(Continued)

FOREIGN PATENT DOCUMENTS

| | | |
|---|---|---|
| CN | 105845304 A | 8/2016 |
| JP | 2008-029148 A | 2/2008 |

OTHER PUBLICATIONS

Ding Xiaofeng et al, "Modeling of Permanent Magnets Temperature of Traction Motors in HEV", Electric Machines and Control, vol. 16, No. 10, pp. 101-106, Oct. 2012.

*Primary Examiner* — Mohamad A Musleh
(74) *Attorney, Agent, or Firm* — Oliff PLC

(57) ABSTRACT

A motor includes a magnet and a coil. $\alpha 2=[\{(Br2-Br1)/Br1\}/(T2-T1)]\times 100\geq 0.11$ and $\alpha 3=[\{(Br3-Br1)/Br1\}/(T3-T1)]\times 100\leq 0.13$ are satisfied. In the magnet, Br1 (mT) is a residual magnetic flux density at T1 (° C.), Br2 (mT) is a residual magnetic flux density at T2 (° C.), and Br3 (mT) is a residual magnetic flux density at T3 (° C.), and $\alpha 2$ (%/° C.) is a temperature coefficient at a target temperature of T2 (° C.) with respect to a reference temperature of T1 (° C.), and $\alpha 3$ (%/° C.) is a temperature coefficient at a target temperature of T3 (° C.) with respect to a reference temperature of T1 (° C.) in conditions of T1=20, T2=100, and T3=220.

20 Claims, 1 Drawing Sheet

(56) References Cited

U.S. PATENT DOCUMENTS

| | | | | |
|---|---|---|---|---|
| 2015/0001980 A1* | 1/2015 | Zhang | ................... | H02K 21/16 |
| | | | | 310/156.43 |
| 2015/0022126 A1* | 1/2015 | Schulz | ................... | H02P 21/22 |
| | | | | 318/400.02 |
| 2015/0171679 A1* | 6/2015 | Nishiyama | ............. | H02K 1/278 |
| | | | | 310/156.07 |
| 2015/0288233 A1* | 10/2015 | Kim | ................... | H02K 1/2766 |
| | | | | 310/156.43 |
| 2016/0225502 A1 | 8/2016 | Miwa et al. | | |
| 2017/0346432 A1* | 11/2017 | Iwasaki | ................ | H02K 1/2766 |

\* cited by examiner

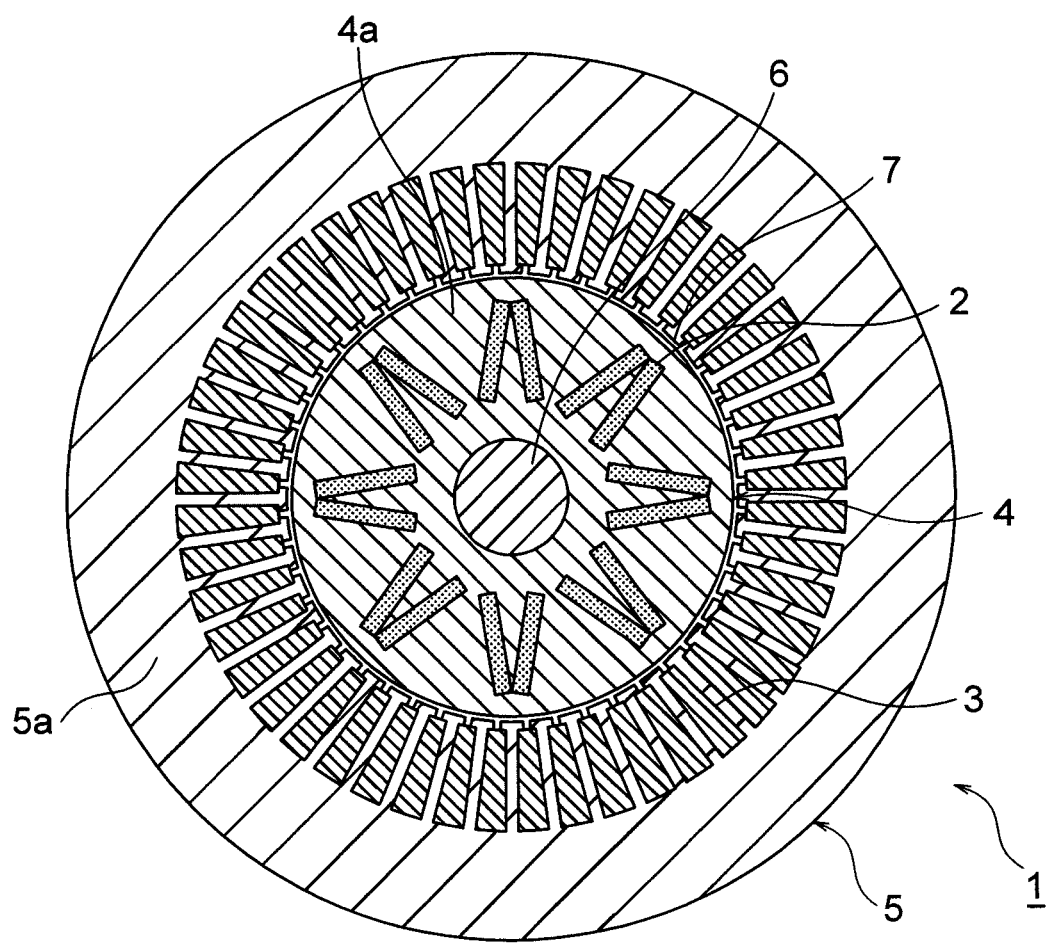

MOTOR

BACKGROUND OF THE INVENTION

1. Field of the Invention

The present invention relates to a motor.

2. Description of the Related Art

Patent Document 1 discloses a variable magnetic flux drive system that changes a magnetic force of a magnet in a motor. This system improves its entire efficiency and can correspond to a wide speed range.

However, the system disclosed in Patent Document 1 is complicated in control. Furthermore, the system needs a certain level or more magnetic field to change the magnetic force of the magnet and flows an electric current corresponding to the magnetic field through a coil. To do this, the motor needs to be temporarily stopped for determination of a position of the magnet to the coil. A large magnetic field is necessary for change in magnetization of the magnet, and a coil and a power source for the large magnetic field are a large scale.

Patent Document 1: JP 2008-029148A

SUMMARY OF THE INVENTION

The present invention has been achieved under such circumstances. It is an object of the invention to obtain a motor having an easy system control and no need to be temporarily stopped for change in a magnetic force of a magnet.

To achieve the above object, the motor of the present invention is a motor including a magnet and a coil, wherein $$\alpha 2=[\{(Br2-Br1)/Br1\}/(T2-T1)]\times 100 \geq -0.11 \text{ and}$$

$$\alpha 3=[\{(Br3-Br1)/Br1\}/(T3-T1)]\times 100 \leq -0.13 \text{ are satisfied, where in the magnet,}$$

Br1 (mT) is a residual magnetic flux density at T1 (° C.), Br2 (mT) is a residual magnetic flux density at T2 (° C.), and Br3 (mT) is a residual magnetic flux density at T3 (° C.), and α2 (%/° C.) is a temperature coefficient at a target temperature of T2 (° C.) with respect to a reference temperature of T1 (° C.), and α3 (%/° C.) is a temperature coefficient at a target temperature of T3 (° C.) with respect to a reference temperature of T1 (° C.) in conditions of T1=20, T2=100, and T3=220.

The motor of the present invention has the above configuration, and thus has an easy system control and no need to be temporarily stopped for change in a magnetic force of the coil.

Preferably, the magnet is an R-T-B based permanent magnet,

R is one or more rare earth elements, T is one or more transition metal elements essentially including Fe or Fe and Co, and B is boron, the R-T-B based permanent magnet contains C, and R is contained at 29 mass % or more and 32 mass % or less, B is contained at 0.80 mass % or more and 0.95 mass % or less, and C is contained at 0.05 mass % or more and 0.20 mass % or less, where a whole of the R-T-B based permanent magnet is 100 mass %.

Preferably, B and C are contained in total at 0.88 mass % or more and 1.10 mass % or less.

Preferably, the R-T-B based permanent magnet further contains O and N, O is contained at 0.03 mass % or more and 0.15 mass % or less, and N is contained at 0.03 mass % or more and 0.10 mass % or less.

Preferably, the R-T-B based permanent contains Si at 0 mass % or more and 0.4 mass % or less.

Preferably, Br1≥1300 mT is satisfied.
Preferably, Br2≥1200 mT is satisfied.
Preferably, Br3≤1050 mT is satisfied.
Preferably, the motor of the present invention is an IPM motor.

BRIEF DESCRIPTION OF THE DRAWINGS

The FIGURE is a schematic view of an IPM motor according to the present embodiment.

DESCRIPTION OF THE PREFERRED EMBODIMENTS

Hereinafter, the present invention will be described based on an embodiment shown in the FIGURE.

As shown in the FIGURE, an IPM motor 1 is a motor according to the present embodiment and consists of a rotor 4, a stator 5, and a shaft 6. IPM is an abbreviation of Interior Permanent Magnet, and an IPM motor is a motor having a magnet embedded structure.

In the IPM motor 1, the rotor 4 and the stator 5 are arranged via a space 7 between the stator and the rotor. In the rotor 4, a permanent magnet 2 is embedded in a slot (not shown) in a rotor iron core 4a. The stator 5 has a stator iron core 5a and a coil 3.

In the present embodiment, the slot represents a space arranged in the rotor iron core 4a for embedding the permanent magnet 2 in the rotor iron core 4a. The rotor 4 contains the permanent magnet 2 and the rotor iron core 4a, and the stator 5 contains the coil 3 and the stator iron core 5a.

From a viewpoint of heat control, an air gap is preferably provided between the permanent magnet 2 and the rotor iron core 4a, but it is difficult for the permanent magnet 2 and the rotor iron core 4a to completely avoid touching each other.

The permanent magnet 2 is preferably fixed to the rotor iron core 4a. When the permanent magnet 2 is not fixed to the rotor iron core 4a, the permanent magnet 2 moves in using the motor. In this case, a contact state between the permanent magnet 2 and the rotor iron core 4a changes. This causes a variation of electric resistance between the permanent magnet 2 and the rotor iron core 4a and generates unevenness of eddy current mentioned later. Then, heat generation by eddy current becomes uneven, and it becomes hard to control a magnet temperature. The permanent magnet 2 is fixed to the rotor iron core 4a by any method, but is preferably fixed by filling a resin in the space between the permanent magnet 2 and the rotor iron core 4a. The electric resistance between the permanent magnet 2 and the rotor iron core 4a is preferably 10Ω or less. In this case, it becomes easy to positively generate eddy current described later and appropriately control the magnet temperature.

The arrangement in the rotor of the permanent magnet 2 is not limited and is determined by motor property. From a viewpoint of heat control, the permanent magnet 2 is preferably arranged in a portion having a relatively low temperature. For example, when cooling the permanent magnet 2 from the shaft 6, the permanent magnet 2 is preferably arranged in a portion close to the shaft 6. When cooling the permanent magnet 2 from the stator 5, the permanent magnet 2 is preferably arranged in a portion close to the stator 5. The permanent magnets 2 are preferably arranged in V shape in the rotor 4 as shown in FIGURE because heat generated in the permanent magnets 2 is easily transmitted to both of the shaft 6 and the stator 5.

The permanent magnet 2 inserted into one slot arranged in the rotor iron core 4a is not necessarily single. A plurality of the permanent magnets 2 may be inserted into one slot. The electric resistance between the permanent magnets 2 inserted adjacently in one slot is preferably 10Ω or less. In this case, it becomes easy to positively generate an eddy current mentioned later and appropriately control a magnet temperature. The permanent magnet 2 has any shape, but preferably has a shape where a contact area between a plurality of the magnets can be large. Furthermore, the permanent magnet 2 is preferably a parallelepiped in consideration of cost.

The rotor iron core 4a is preferably composed of a silicon steel sheet. In case of using a silicon steel sheet, the rotor iron core 4a can be manufactured by providing the silicon steel sheet with a hole to be the slot and overlapping a plurality of the sheets. In this case, the silicon steel sheet preferably has a thickness of 0.25 mm or more and 0.5 mm or less per one sheet from a viewpoint of facilitation of the temperature control.

In a conventional IPM motor capable of utilizing a reluctance torque due to magnetization of a rotor iron core in addition to a magnet torque due to magnetization of a permanent magnet, the magnet torque is useful in low-speed rotation, but on the contrary causes lowering of torque in high-speed rotation. This is because a counter electromotive force generated in a coil of a stator by a magnetic force of the permanent magnet becomes large in high-speed rotation. In addition, it is necessary to generate a counter magnetic field for offsetting the counter electromotive force. This counter magnetic field reduces the efficiency of the motor.

However, the IPM motor according to the present embodiment shown below can improve torque and efficiency in wide temperature range and rotation number range.

In the IPM motor 1 according to the present embodiment, an R-T-B based permanent magnet having a temperature coefficient of a residual magnetic flux density within a predetermined range is used as the permanent magnet 2, and torque and efficiency can be thus improved.

Specifically, the permanent magnet 2 having the following relations is used.

Br1 (mT) is a residual magnetic flux density of the permanent magnet 2 at T1 (° C.), Br2 (mT) is a residual magnetic flux density of the permanent magnet 2 at T2 (° C.), and Br3 (mT) is a residual magnetic flux density of the permanent magnet 2 at T3 (° C.). T1=20, T2=100, and T3=220 are satisfied. α2 (%/° C.) is a temperature coefficient of the permanent magnet 2 at a target temperature of T2 (° C.) with respect to a reference temperature of T1 (° C.). α3 (%/° C.) is a temperature coefficient of the permanent magnet 2 at a target temperature of T3 (° C.) with respect to a reference temperature of T1 (° C.). In this case, the permanent magnet 2 satisfying the following relations is used.

$$\alpha 2=[\{(Br2-Br1)/Br1\}/(T2-T1)]\times 100 \geq -0.11$$

$$\alpha 3=[\{(Br3-Br1)/Br1\}/(T3-T1)]\times 100 \leq -0.13$$

Here, since α2≥−0.11 is satisfied, the permanent magnet 2 is a magnet excellent in a temperature property at 100° C. and excellent even when used for ordinary purpose at low temperature. Since the permanent magnet 2 satisfies α3≤−0.13, however, a lowering width of a residual magnetic flux density at 220° C. is larger as compared to a residual magnetic flux density at 20° C.

With such a permanent magnet 2, the IPM motor 1 according to the present embodiment is excellent in torque and efficiency not only in the case of low temperature (100° C.) and low-speed use but also in the case of high temperature (220° C.) and high-speed use. That is, with the above permanent magnet 2, the IPM motor 1 is excellent in torque and efficiency at wide range temperature and rotation number.

Preferably, Br1≥1300 mT is satisfied. Preferably, Br2≥1200 mT is satisfied. Preferably, Br3≤1050 mT is satisfied. Furthermore, a relative permeability μr at T3 is preferably 1.03 or more because the effects of the present invention can be demonstrated at an actual operating point of the motor. Incidentally, a relative permeability μr is a gradient in the second quadrant of a demagnetization curve of a magnetic flux density with respect to a magnetic field representing magnetic properties by cgs unit.

In the present application, a low speed represents a state where a rotation number is 50% or less of a maximum rotation number, and a high speed represents a state where a rotation number is 80% or more of a maximum rotation number. Incidentally, a motor having a maximum rotation number of 6000 rpm or more and 20000 rpm or less is often used as EV motors and HEV motors. A motor having a maximum rotation number of around 2000 rpm is often used as a motor for washing machine.

The present inventors conceive that the following mechanism shows how torque and efficiency are improved in wide temperature range and rotation number range using the permanent magnet 2 having the above structure.

First, in the IPM motor 1, the rotor 4 is rotated using a magnet torque due to the permanent magnet 2 and a reluctance torque due to a magnetic circuit design. In the low-speed rotation, a counter electromotive force mentioned later is small, and thus the higher the magnet torque is, the higher the entire torque is. In the high-speed rotation, however, the higher the magnet torque is, the larger a counter electromotive force generated in the coil 3 of the stator 5 by a magnetic force of the permanent magnet 2 is, and the reluctance torque is decreased. The reluctance torque is decreased, and the entire torque is thus decreased. A counter magnetic field needs to be applied for offsetting this counter electromotive force, and this counter magnetic field reduces the efficiency of the IPM motor 1.

When the rotor 4 of the IPM motor 1 is rotated at high speed, an eddy current occurs in the permanent magnet 2. And the permanent magnet 2 becomes high temperature due to Joule heat of the eddy current. This heat generation lowers residual magnetic flux density Br of the permanent magnet 2. At this time, with the permanent magnet 2 according to the present embodiment and α3≤−0.13, the lowering of residual magnetic flux density Br due to the heat generation becomes large in the present embodiment. Then, the lowering of a magnetic flux amount of the permanent magnet 2 becomes large. The lowering of the magnetic flux amount lowers the magnet torque, and the counter electromotive force is thus decreased. Thus, the reluctance torque becomes high, and the entire torque of the IPM motor 1 in the case of high temperature and high speed use becomes high. In addition, a counter electromotive force in the case of high temperature and high speed use is also decreased, and thus an intensity of a necessary counter magnetic field is also decreased, and the efficiency is improved.

When the IPM motor 1 is switched from the high-speed rotation to the low-speed rotation, the temperature of the permanent magnet 2 is preferably decreased. There is no limit to the method for controlling the temperature of the permanent magnet 2 depending on the rotation number of the IPM motor 1. For example, the temperature of the permanent magnet 2 can be controlled by monitoring the rotation number of the IPM motor 1 using a sensor and operating a cooling mechanism (air cooling, water cooling, oil cooling etc.) depending on the rotation number.

When the temperature of the permanent magnet 2 is decreased, residual magnetic flux density Br of the permanent magnet 2 is increased. Then, the magnet flux amount of the permanent magnet 2 becomes large, and the magnet torque becomes large. In the present embodiment, since the permanent magnet 2 having a large residual magnetic flux density at a low temperature, that is, the permanent magnet 2 satisfying $\alpha 2 \geq -0.11$ is used, the torque at low-speed rotation is improved, and the efficiency at low-speed rotation is improved. In the IPM motor 1, a magnetic force of a magnet can be largely changed by merely changing the temperature, and thus the system control for changing the magnetic force of the magnet is easy, and there is no need to temporarily stop the motor for changing the magnetic force of the magnet.

A rare earth permanent magnet is used as the permanent magnet 2, for example. There is no limit to the composition of the rare earth permanent magnet. For example, an R-T-B based permanent magnet may be used.

R is one or more rare earth elements. There is no limit to the kind of R, but R preferably contains Nd and more preferably contains Nd and Pr. Furthermore, R may contain one or more selected from a group of Dy and Tb.

T is one or more transition metal elements essentially including Fe or Fe and Co.

B is boron.

The R-T-B based permanent magnet according to the present embodiment may further contain C.

The R-T-B based permanent magnet according to the present embodiment may further contain O and N.

The R-T-B based permanent magnet according to the present embodiment may further contain Si.

The R-T-B based permanent magnet according to the present embodiment may further contain elements other than the above. There is no limit to the kind of the other elements.

The R-T-B based permanent magnet according to the present embodiment preferably contains R, B, and C at the following contents with respect to the total mass.

R: 29 mass % or more and 32 mass % or less
B: 0.80 mass % or more and 0.95 mass % or less
C: 0.05 mass % or more and 0.20 mass % or less The content of Pr contained in R is not limited, and may be 5 mass % or more and 9 mass % or less with respect to the total mass of the R-T-B based permanent magnet. When Pr is contained at a preferable amount, the torque property and efficiency at high temperature can be improved. Tb may be contained. Tb may be contained at 0 mass % or more and 0.8 mass % or less, and when Tb is contained at 0.2 mass % or more and 0.5 mass % or less with respect to the total mass of the R-T-B based permanent magnet, coercivity HcJ is high at high temperature and room temperature, and the torque property and efficiency at low temperature and high temperature are improved. Furthermore, Dy may be contained at 0.2 mass % or more and 0.5 mass % or less, which has an effect of further improvement in the torque property and efficiency.

B may be contained at 0.80 mass % or more and 0.94 mass % or less. C may be contained at 0.10 mass % or more and 0.20 mass % or less.

B and C may be contained in total at 0.88 mass % or more and 1.10 mass % or less, or may be contained in total at 0.95 mass % or more and 1.02 mass % or less with respect to the total mass.

When B and C are contained in total in the above range, C is preferably contained at a comparatively small amount in case of containing B at a comparatively large amount, and C is preferably contained at a comparatively large amount in case of containing B at a comparatively small amount. When B and C are contained in total at 0.88 mass % or more and 1.10 mass % or less, it is possible to improve coercivity of the R-T-B based permanent magnet finally obtained and improve the torque property and efficiency at low temperature and high temperature. When B and C are contained in total at 0.95 mass % or more and 1.02 mass % or less, it is possible to further improve the torque property and efficiency.

Furthermore, elements other than R, B, and T mentioned above may be contained in total at 3 mass % or less.

The contents of O and N with respect to the total mass may be respectively as below.

O: 0.03 mass % or more and 0.15 mass % or less
N: 0.03 mass % or more and 0.10 mass % or less When O and N are contained in the above ranges, it is possible to improve coercivity of the R-T-B based permanent magnet finally obtained and improve the torque property and efficiency at low temperature and high temperature.

There is no limit to the method for adjusting a temperature coefficient of a residual magnetic flux density to achieve $\alpha 2 \geq -0.11$ and $\alpha 3 \leq -0.13$ at the same time. For example, $\alpha 2 \geq -0.11$ and $\alpha 3 \leq -0.13$ are easily achieved at the same time by decreasing the Curie temperature of the permanent magnet 2. Specifically, one or more selected from a group of Al, S, Si, Mn, and Ga can be solid soluted in an $R_2Fe_{14}B$ phase. There is no limit to the method of solid solution of one or more selected from a group of Al, S, Si, Mn, and Ga. For example, in a manufacture step mentioned later, a raw material powder containing one or more selected from a group of Al, S, Si, Mn, and Ga is added in mixturing of raw material powder. Incidentally, the solid solution of Co is preferable in terms of improving temperature property at low temperature, but tends to increase the Curie temperature. The solid solution of Cu is preferable in terms of improving heat electric resistance of the magnet. The solid solution of Zr is preferable in terms of improving linearity of μr.

Each of the above-mentioned elements is preferably contained at the following amounts.

Al: 0.1 mass % or more and 1 mass % or less
S: 0.01 mass % or more and 0.5 mass % or less
Mn: 0.01 mass % or more and 0.5 mass % or less
Cu: 0.01 mass % or more and 0.5 mass % or less
Zr: 0.05 mass % or more and 0.8 mass % or less
Ga: 0.05 mass % or more and 0.8 mass % or less
Si: 0 mass % or more and 0.4 mass % or less In particular, when Si is contained within the above range, it becomes easy to decrease a residual magnetic flux density at high temperature. Incidentally, Si is further preferably contained at 0 mass % or more and 0.2 mass % or less.

Incidentally, Co is contained at any amount, and may be contained at 0 mass % or more and 2.0 mass % or less, or may be contained at 0.5 mass % or more and 2.0 mass % or less.

As described above, the electric resistance between the permanent magnet 2 and the rotor iron core 4a and the electric resistance between two permanent magnets 2 adjacently inserted into the slot arranged in the rotor iron core 4a are preferably $10^{-4}\Omega$ or more and $10\Omega$ or less. The above electric resistances are easily set to $10^{-4}\Omega$ or more and $10\Omega$ or less by failing to perform a surface treatment against the surfaces of the permanent magnets 2 or by performing a surface treatment for electric conductance against the surfaces of the permanent magnets 2. Examples of the surface treatment for electric conductance include a surface modification by oxidation treatment, chemical conversion treatment, or the like, and a plating.

Hereinafter, a manufacture method of an R-T-B based sintered magnet, which is one of the R-T-B based permanent magnets used for the IPM motor according to the present embodiment, will be described in detail, but a known method is used unless otherwise noted.

The R-T-B based sintered magnet according to the present embodiment can be manufactured by an ordinary powder metallurgy method. This powder metallurgical method includes a preparation step of preparing a raw material alloy, a pulverization step of pulverizing the raw material alloy and obtaining a raw material fine powder, a pressing step of pressing the raw material fine powder and manufacturing a green compact, a sintering step of sintering the green compact and obtaining a sintered body, and a heat treatment step of performing an aging treatment to the sintered body.

The preparation step is a step of preparing a raw material alloy having each element contained in the rare earth magnet according to the present embodiment. First, raw material metals having predetermined elements or so are prepared and used to perform a strip casting or so. This makes it possible to prepare a raw material alloy. The raw material metals or so include rare earth metals, rare earth alloys, pure iron, ferro-boron, carbon, and alloys of these, for example. These raw material metals or so are used to prepare a raw material alloy for obtaining a rare earth magnet having a desired composition.

The strip casting method is explained as a preparation method. In the strip casting method, a molten metal is poured into a tundish, and the molten metal where the raw material metals or so are melted is poured from the tundish onto a rotating copper roll whose inside is water-cooled and is cooled and solidified. A cooling rate of the solidification can be controlled in a desired range by adjusting temperature and supply amount of the molten metal and rotating speed of the cooling roll. The cooling rate of the solidification is preferably appropriately determined based on conditions of composition or so of a rare earth magnet to be manufactured, but is preferably 500° C./second or more and 11000° C./second or less. When the cooling rate of the solidification is controlled in this way, a residual magnetic flux density at a high temperature is decreased, and $\alpha 3 \leq -0.13$ is easily obtained. The mechanism where a residual magnetic flux density at a high temperature is changed due to the above cooling rate is unclear, but the present inventors conceive that the reason for this is that a distribution ratio of the elements solid soluted in the main phase grains is changed depending on the above cooling rate.

The pulverization step is a step of pulverizing the raw material alloy obtained in the preparation step and obtaining a raw material fine powder. This step is preferably carried out by two steps of a coarse pulverization step and a fine pulverization step, but may be carried out by one step of the fine pulverization step.

The coarse pulverization step can be carried out in an inert gas atmosphere using a stamp mill, a jaw crusher, a brown mill, or the like. A hydrogen storage pulverization may be carried out. In the coarse pulverization, the raw material alloy is pulverized until a coarse powder having a grain size of about hundreds μm to several mm is obtained.

In the fine pulverization step, the coarse powder obtained in the coarse pulverization step (the raw material alloy in case of omitting the coarse pulverization step) is finely pulverized to prepare a raw material fine powder having an average grain size of about several μm. The raw material fine powder has an average grain size determined by considering a growth degree of crystal grains after being sintered. The fine pulverization can be carried out by using a jet mill, for example.

A pulverization aid can be added before the fine pulverization. When a pulverization aid is added, pulverization property is improved, and magnetic field orientation in the pressing step becomes easy. There is no limit to kind or additive amount of the pulverization aid.

The pressing step is a step of pressing the raw material fine powder in a magnetic field and manufacturing a green compact. Specifically, the green compact is manufactured by conducting the pressing in such a manner that the raw material fine powder is filled in a press mold arranged in an electromagnet, and the raw material fine powder is thereafter pressurized while the electromagnet is used to apply a magnetic field to orient crystal axes of the raw material fine powder. The pressing in magnetic field is carried out at about 30 MPa or more and 300 MPa or less in a magnetic field of 1000 kA/m or more and 1600 kA/m or less, for example.

The sintering step is a step of sintering the green compact and obtaining a sintered body. The sintered body can be obtained by sintering the green compact in a vacuum or in an inert gas atmosphere after the pressing in magnetic field. The sintering conditions are appropriately determined depending upon conditions of composition of the green compact, pulverization method of the raw material fine powder, powder size, and the like.

The heat treatment step is a step of performing an aging treatment to the sintered body. The heat treatment is performed at a temperature range of 400° C. or more and 900° C. or less, and may be performed by two steps. When the heat treatment temperature is changed within the above range, it is possible to change a residual magnetic flux density at a high temperature and control $\alpha 3$.

The cooling rate after the heat treatment is preferably 50° C./minute or more and 250° C./minute or less. When the cooling rate is changed within the above range, it is possible to change a residual magnetic flux density at a high temperature and control $\alpha 3$.

The present embodiment may include a step of performing a grain boundary diffusion of heavy rare earth elements in the sintered body. The grain boundary diffusion can be carried out by performing a heat treatment after heavy rare earth elements are attached to the surface of the sintered body subjected to a pretreatment as necessary by application, deposition, or the like. This makes it possible to further improve coercivity of the R-T-B based sintered magnet finally obtained. Incidentally, there is no limit to the contents of the pretreatment. For example, the pretreatment is a treatment of performing an etching by a known method, then cleaning, and drying.

Incidentally, heavy rare earth elements are attached by any method. For example, there is a method using vapor deposition, sputtering, electrodeposition, spray coating, brush coating, dispenser, nozzle, screen printing, squeegee printing, sheet construction, or the like.

The heavy rare earth elements are adhered and then diffused in the sintered body. There is no limit to the diffusion treatment, but the diffusion treatment is normally performed by heating in vacuum or in inert gas. The diffusion treatment temperature is not limited either.

The R-T-B based sintered body obtained by the above steps may be subjected to the surface treatment, such as plating, resin coating, oxidation treatment, and chemical conversion treatment.

The R-T-B based sintered body obtained by the above steps is finally processed into an R-T-B based sintered magnet by applying a magnetic field before and after being combined with the rotor. A magnetization rate is a rate not in a complete magnetization state when a flux generated by the magnet magnetized by a magnetic field of 5 T is 100%. The temperature coefficient of Br can be changed by changing the magnetization rate. The magnetization rate is preferably 97.0% or more and 100.0% or less, more preferably 97.0% or more and 99.5% or less. When the magnetization rate is 97.0% or more and 100.0% or less, $\alpha3 \leq -0.13$ is easily achieved, and the torque and efficiency at low temperature are easily improved. Furthermore, when the magnetization rate is 97.0% or more and 99.5% or less, the efficiency at high temperature is easily improved.

The IPM motor 1 according to the present embodiment can be manufactured by an ordinary manufacture method except for using the above R-T-B based sintered magnet, and is manufactured by any method.

The embodiment of the present invention has been accordingly described, but the present invention is not limited to the above embodiment and may be variously changed within the scope thereof.

For example, the above embodiment describes a case where the R-T-B based rare earth permanent magnet is used for the IPM motor 1, but may be used for motors other than the IPM motor 1. The R-T-B based rare earth permanent magnet having the above temperature property is particularly suitable for motors using a magnet torque and a reluctance torque. From this point of view, it is conceivable that linear motors can obtain favorable properties by using the permanent magnet of the present embodiment. In addition to the IPM motors and the linear motors, the above R-T-B based rare earth permanent magnet for motors can be used for SPM motors, permanent magnet direct current motors, voice coil motors, vibration motors, and the like.

The R-T-B based permanent magnet according to the present embodiment is not limited to R-T-B based sintered magnets manufactured by sintering, but for example, may be R-T-B based permanent magnets manufactured by hot forming and hot working instead of sintering.

When a cold-formed body obtained by forming a raw material powder at room temperature is subjected to a hot forming by being pressed in a hot state, pores remaining on the cold-formed body disappear, and the cold-formed body can be densified without sintering. Furthermore, when a formed body obtained by the hot forming is subjected to hot extrusion working as hot working, it is possible to obtain an R-T-B based permanent magnet having a desired shape and magnetic anisotropy.

The motor of the present invention can be used for any purpose. For example, the motor of the present invention can be used for a compressor of an automobile (especially HV, HEV, FCV etc.) as well as a compressor such as an air conditioner.

EXAMPLES

Hereinafter, the subject matter of the present invention will be described in more detail with reference to examples and comparative examples, but the present invention is not limited to the examples.

First, in order to obtain sintered magnets having compositions of each example and comparative example shown in Table 1 by weight ratio, raw material alloys having the above compositions were prepared by strip casting (SC) method. Incidentally, the cooling rate of solidification of the raw material alloys was 2500° C./second.

TABLE 1

| | Nd (mass %) | Pr (mass %) | Tb (mass %) | Dy (mass %) | R in total (mass %) | Co (mass %) | Al (mass %) | Si (mass %) | Cu (mass %) | Zr (mass %) | Ga (mass %) | B (mass %) | C (mass %) | B + C (mass %) |
|---|---|---|---|---|---|---|---|---|---|---|---|---|---|---|
| Ex. 1 | 24.0 | 7.0 | 0.0 | 0.0 | 31.0 | 2.0 | 0.4 | 0.0 | 0.3 | 0.2 | 0.4 | 0.88 | 0.10 | 0.98 |
| Ex. 2 | 24.0 | 7.0 | 0.0 | 0.0 | 31.0 | 2.0 | 0.4 | 0.0 | 0.3 | 0.4 | 0.4 | 0.83 | 0.13 | 0.96 |
| Ex. 3 | 24.0 | 7.0 | 0.0 | 0.0 | 31.0 | 2.0 | 0.4 | 0.2 | 0.3 | 0.2 | 0.5 | 0.83 | 0.13 | 0.96 |
| Ex. 4 | 24.0 | 7.0 | 0.0 | 0.0 | 31.0 | 2.0 | 0.2 | 0.0 | 0.3 | 0.2 | 0.4 | 0.80 | 0.20 | 1.00 |
| Ex. 5 | 24.0 | 7.0 | 0.0 | 0.0 | 31.0 | 2.0 | 0.4 | 0.0 | 0.2 | 0.2 | 0.4 | 0.94 | 0.05 | 0.99 |
| Ex. 6 | 24.0 | 5.0 | 0.0 | 0.0 | 29.0 | 2.0 | 0.4 | 0.0 | 0.3 | 0.2 | 0.6 | 0.88 | 0.11 | 0.99 |
| Ex. 7 | 23.0 | 9.0 | 0.0 | 0.0 | 32.0 | 2.0 | 0.4 | 0.0 | 0.4 | 0.2 | 0.4 | 0.88 | 0.12 | 1.00 |
| Ex. 8 | 24.0 | 7.0 | 0.5 | 0.0 | 31.5 | 2.0 | 0.3 | 0.0 | 0.3 | 0.2 | 0.4 | 0.83 | 0.13 | 0.96 |
| Ex. 9 | 24.0 | 7.0 | 0.3 | 0.3 | 31.6 | 2.0 | 0.3 | 0.0 | 0.3 | 0.2 | 0.4 | 0.83 | 0.13 | 0.96 |
| Ex. 10 | 24.0 | 7.0 | 0.0 | 0.0 | 31.0 | 0.5 | 0.4 | 0.0 | 0.3 | 0.2 | 0.4 | 0.88 | 0.10 | 0.98 |
| Comp. Ex. 1 | 24.0 | 7.0 | 0.0 | 0.0 | 31.0 | 2.0 | 0.4 | 0.0 | 0.3 | 0.2 | 0.4 | 0.96 | 0.10 | 1.06 |
| Comp. Ex. 2 | 24.0 | 7.0 | 0.0 | 0.0 | 31.0 | 4.0 | 0.4 | 0.2 | 0.3 | 0.2 | 0.4 | 0.83 | 0.13 | 0.96 |
| Comp. Ex. 3 | 24.0 | 7.0 | 0.0 | 0.0 | 31.0 | 2.0 | 0.4 | 0.0 | 0.3 | 0.2 | 0.4 | 0.78 | 0.10 | 0.88 |
| Comp. Ex. 4 | 24.0 | 7.0 | 0.0 | 0.0 | 31.0 | 2.0 | 0.4 | 0.2 | 0.3 | 0.2 | 0.4 | 0.94 | 0.03 | 0.97 |
| Comp. Ex. 5 | 24.0 | 7.0 | 0.0 | 0.0 | 31.0 | 2.0 | 0.4 | 0.2 | 0.3 | 0.2 | 0.4 | 0.83 | 0.22 | 1.05 |

Next, hydrogen was storaged in the raw material alloys at room temperature, and the raw material alloys were subjected to hydrogen pulverization (coarse pulverization) by a dehydrogenation treatment at 540° C. for 3 hours. Incidentally, each step (fine pulverization and pressing) from the hydrogen pulverization treatment to sintering was carried out in an atmosphere having an oxygen concentration of less than 100 ppm in each example and comparative example.

Next, a zinc stearate was added as a pulverization aid to the coarsely pulverized powders of the raw material alloys at 0.03 wt % or more and 0.13 wt % or less before a fine pulverization and after the hydrogen pulverization, and the coarsely pulverized powders were mixed using a Nauta Mixer. Thereafter, the fine pulverization was carried out using a jet mill to obtain a finely pulverized powder having an average grain size of about 3 μm.

The finely pulverized powder obtained was filled in a press mold arranged in an electromagnet and pressed at 120 MPa while applying a magnetic field of 1200 kA/m to obtain a green compact. Thereafter, the obtained green compact was fired while being held in a vacuum at 1050° C. or more and 1070° C. or less for 4 hours or more and 12 hours or less, and was then rapidly cooled to obtain a sintered body (R-T-B based sintered magnet) having the above compositions The obtained sintered body was subjected to a two-step aging treatment at 800° C. for 1 hour and at 500° C. for 1 hour (both in Ar gas atmosphere), and was rapidly cooled to obtain an R-T-B based sintered magnet of each example and comparative example shown in Table 1. Incidentally, each magnet had a rectangular parallelopiped shape of 11 mm×11 mm×10 mm. Table 1 shows analysis results of contents of C in the obtained sintered magnets.

Each of the obtained R-T-B based sintered magnets was magnetized at 5 T and measured in terms of residual magnetic flux density using a B-H tracer. Br1, Br2, and Br3 were respectively measured in conditions of T1=20° C., T2=100° C., and T3=220° C. to calculate α2 and α3. The results are shown in Table 2.

TABLE 2

|  | Br1 (mT) | Br2 (mT) | Br3 (mT) | α2 (%/° C.) | α3 (%/° C.) |
| --- | --- | --- | --- | --- | --- |
| Ex. 1 | 1392 | 1280 | 1025 | −0.101 | −0.132 |
| Ex. 2 | 1385 | 1267 | 1012 | −0.106 | −0.135 |
| Ex. 3 | 1363 | 1246 | 980 | −0.107 | −0.140 |
| Ex. 4 | 1370 | 1251 | 1002 | −0.109 | −0.134 |
| Ex. 5 | 1401 | 1290 | 1023 | −0.099 | −0.135 |
| Ex. 6 | 1415 | 1298 | 1033 | −0.103 | −0.135 |
| Ex. 7 | 1383 | 1266 | 1022 | −0.106 | −0.131 |
| Ex. 8 | 1365 | 1245 | 999 | −0.110 | −0.134 |
| Ex. 9 | 1360 | 1242 | 1001 | −0.108 | −0.132 |
| Ex. 10 | 1390 | 1269 | 1010 | −0.109 | −0.137 |
| Comp. Ex. 1 | 1396 | 1300 | 1052 | −0.086 | −0.123 |
| Comp. Ex. 2 | 1383 | 1267 | 1055 | −0.105 | −0.119 |
| Comp. Ex. 3 | 1314 | 1187 | 990 | −0.121 | −0.123 |
| Comp. Ex. 4 | 1390 | 1252 | 1048 | −0.124 | −0.123 |
| Comp. Ex. 5 | 1366 | 1236 | 1032 | −0.119 | −0.122 |

Furthermore, a two-dimensional simulation was carried out provided that each of the obtained R-T-B based sintered magnets (Examples 1 to 10 and Comparative Examples 1 to 5) was applied to the IPM motor shown in FIGURE and torque and efficiency were calculated. In this simulation, an oil cooling was used as a cooling mechanism. In this simulation, the efficiency was calculated as output/input, the input was calculated by measuring electricity, the output was calculated by angular speed×torque. The angular speed was calculated by rotation number.

Then, torque and efficiency at a fixed rotation number of 3000 rpm and a temperature of 100° C. were simulated. Furthermore, torque and efficiency at a fixed rotation number of 8200 rpm and a temperature of 220° C. were simulated. The results are shown in Table 3 and Table 4.

TABLE 3

| | Torque ratio | |
| --- | --- | --- |
| | 100° C., 3000 rpm | 220° C., 8200 rpm |
| Ex. 1 | 1.000 | 1.000 |
| Ex. 2 | 0.995 | 1.016 |
| Ex. 3 | 0.995 | 1.048 |
| Ex. 4 | 0.994 | 1.014 |
| Ex. 5 | 1.001 | 1.017 |
| Ex. 6 | 0.998 | 1.018 |
| Ex. 7 | 0.996 | 0.993 |
| Ex. 8 | 0.993 | 1.012 |
| Ex. 9 | 0.994 | 1.001 |
| Ex. 10 | 0.993 | 1.027 |
| Comp. Ex. 1 | 1.012 | 0.952 |
| Comp. Ex. 2 | 0.997 | 0.926 |
| Comp. Ex. 3 | 0.984 | 0.952 |
| Comp. Ex. 4 | 0.981 | 0.951 |
| Comp. Ex. 5 | 0.985 | 0.947 |

TABLE 4

| | Efficiency ratio | |
| --- | --- | --- |
| | 100° C., 3000 rpm | 220° C., 8200 rpm |
| Ex. 1 | 1.0000 | 1.0000 |
| Ex. 2 | 0.9998 | 1.0008 |
| Ex. 3 | 0.9998 | 1.0025 |
| Ex. 4 | 0.9997 | 1.0007 |
| Ex. 5 | 1.0001 | 1.0009 |
| Ex. 6 | 0.9999 | 1.0009 |
| Ex. 7 | 0.9998 | 0.9996 |
| Ex. 8 | 0.9997 | 1.0007 |
| Ex. 9 | 0.9997 | 1.0000 |
| Ex. 10 | 0.9997 | 1.0014 |
| Comp. Ex. 1 | 1.0005 | 0.9975 |
| Comp. Ex. 2 | 0.9998 | 0.9961 |
| Comp. Ex. 3 | 0.9993 | 0.9975 |
| Comp. Ex. 4 | 0.9991 | 0.9974 |
| Comp. Ex. 5 | 0.9993 | 0.9972 |

In the present embodiment, torque ratio is the ratio when torque of Example 1 is 1.000, and efficiency ratio is the ratio when efficiency of Example 1 is 1.0000. Table 3 describes torque ratios. Table 4 describes efficiency ratios. In the present example, torque ratios within ±1.0% based on Example 1, that is, torque ratios within 0.990 or more and 1.010 or less are evaluated as nearly equal, and efficiency ratios within ±0.04% based on Example 1, that is, efficiency ratios within 0.9996 or more and 1.0004 or less are evaluated as nearly equal.

The torques at 100° C. of all examples and comparative examples are excellent equally to or more than the torque at 100° C. of Example 1, except that the torques at 100° C. of Comparative Examples 3 to 5 are poor. The efficiencies at 100° C. of all examples and comparative examples are excellent equally to or more than the efficiency at 100° C. of Example 1, except that the efficiencies at 100° C. of Comparative Examples 3 to 5 are poor.

The torques at 220° C. of Examples 1 to 10 are more excellent than those of Comparative Examples 1 to 5. The efficiencies at 220° C. of Examples 1 to 10 are more excellent than those of Comparative Examples 1 to 5.

The motor using the magnet of Examples 1 to 10 having a large absolute value of α3 is more excellent in torque and efficiency than Comparative Examples 1 to 5 when used at both around 100° C. and 220° C.

NUMERICAL REFERENCES

1 . . . IPM motor
2 . . . permanent magnet

3 . . . coil
4 . . . rotor
4a . . . rotor iron core
5 . . . stator
5a . . . stator iron core
6 . . . shaft
7 . . . space between rotor and stator

The invention claimed is:

1. A motor comprising:
a rotor comprising a rotor iron core, a permanent magnet being embedded in a slot in the rotor iron core; and
a stator separated from the rotor by a space, the stator comprising a stator iron core and a coil, wherein $$\alpha 2=[\{(Br2-Br1)/Br1\}/(T2-T1)]\times 100 \geq -0.11 \text{ and}$$

$$\alpha 3=[\{(Br3-Br1)/Br1\}/(T3-T1)]\times 100 \leq -0.13 \text{ are satisfied, where in the magnet,}$$

Br1 (mT) is a residual magnetic flux density at T1 (° C.), Br2 (mT) is a residual magnetic flux density at T2 (° C.), and Br3 (mT) is a residual magnetic flux density at T3 (° C.), and
$\alpha 2$ (%/° C.) is a temperature coefficient at a target temperature of T2 (° C.) with respect to a reference temperature of T1 (° C.), and $\alpha 3$ (%/° C.) is a temperature coefficient at a target temperature of T3 (° C.) with respect to a reference temperature of T1 (° C.) in conditions of T1=20, T2=100, and T3=220.

2. The motor according to claim 1, wherein
the magnet is an R-T-B based permanent magnet,
R is one or more rare earth elements, T is one or more transition metal elements essentially including Fe or Fe and Co, and B is boron,
the R-T-B based permanent magnet further contains C, and
R is contained at 29 mass % or more and 32 mass % or less, B is contained at 0.80 mass % or more and 0.95 mass % or less, and C is contained at 0.05 mass % or more and 0.20 mass % or less, where a whole of the R-T-B based permanent magnet is 100 mass %.

3. The motor according to claim 2, wherein B and C are contained in total at 0.88 mass % or more and 1.10 mass % or less.

4. The motor according to claim 2, wherein
the R-T-B based permanent magnet further contains O and N,
O is contained at 0.03 mass % or more and 0.15 mass % or less, and
N is contained at 0.03 mass % or more and 0.10 mass % or less.

5. The motor according to claim 3, wherein
the R-T-B based permanent magnet further contains O and N,
O is contained at 0.03 mass % or more and 0.15 mass % or less, and
N is contained at 0.03 mass % or more and 0.10 mass % or less.

6. The motor according to claim 2, wherein the R-T-B based permanent contains Si at 0 mass % or more and 0.4 mass % or less.

7. The motor according to claim 3, wherein the R-T-B based permanent contains Si at 0 mass % or more and 0.4 mass % or less.

8. The motor according to claim 4, wherein the R-T-B based permanent contains Si at 0 mass % or more and 0.4 mass % or less.

9. The motor according to claim 5, wherein the R-T-B based permanent contains Si at 0 mass % or more and 0.4 mass % or less.

10. The motor according to claim 1, wherein Br1≥1300 mT is satisfied.

11. The motor according to claim 2, wherein Br1≥1300 mT is satisfied.

12. The motor according to claim 3, wherein Br1≥1300 mT is satisfied.

13. The motor according to claim 1, wherein Br2≥1200 mT is satisfied.

14. The motor according to claim 2, wherein Br2≥1200 mT is satisfied.

15. The motor according to claim 3, wherein Br2≥1200 mT is satisfied.

16. The motor according to claim 1, wherein Br3≤1050 mT is satisfied.

17. The motor according to claim 2, wherein Br3≤1050 mT is satisfied.

18. The motor according to claim 3, wherein Br3≤1050 mT is satisfied.

19. The motor according to claim 1, wherein the motor is an IPM motor.

20. The motor according to claim 2, wherein the motor is an IPM motor.

* * * * *